(12) United States Patent
Du et al.

(10) Patent No.: US 10,015,557 B2
(45) Date of Patent: Jul. 3, 2018

(54) CONTENT-BASED CONTROL SYSTEM

(75) Inventors: Yangzhou Du, Beijing (CN); Wenlong Li, Beijing (CN)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 13/996,667

(22) PCT Filed: Dec. 31, 2011

(86) PCT No.: PCT/CN2011/085172
§ 371 (c)(1),
(2), (4) Date: Sep. 6, 2013

(87) PCT Pub. No.: WO2013/097232
PCT Pub. Date: Jul. 4, 2013

(65) Prior Publication Data
US 2014/0196083 A1 Jul. 10, 2014

(51) Int. Cl.
*H04N 7/10* (2006.01)
*H04N 7/025* (2006.01)
(Continued)

(52) U.S. Cl.
CPC ......... *H04N 21/4882* (2013.01); *G06Q 10/10* (2013.01); *G06Q 50/01* (2013.01);
(Continued)

(58) Field of Classification Search
CPC combination set(s) only.
See application file for complete search history.

(56) References Cited

U.S. PATENT DOCUMENTS 7,165,224 B2  1/2007 Pyhälammi
7,583,676 B2  9/2009 Shobatake
(Continued)

FOREIGN PATENT DOCUMENTS

CN      1666496 A    9/2005
CN    101202818 A    6/2008
(Continued)

OTHER PUBLICATIONS

International Search Report and Written Opinion received for PCT Application No. PCT/CN2011/001549, dated Jun. 21, 2012, 10 Pages.
(Continued)

*Primary Examiner* — Alexander Gee
(74) *Attorney, Agent, or Firm* — Grossman, Tucker, Perreault & Pfleger, PLLC

(57) ABSTRACT

Generally this disclosure describes a method for controlling the operation of a system based on a determination of content that is airing on a channel. A method may include transmitting at least one message including instructions to sample content from a channel, receiving a message indicating that certain content on the channel is complete, and activating a notification indicating that the certain content on the channel is complete. Another method may include receiving a message including instructions to sample content from a channel, sampling content from the channel, transmitting a message including the content sample, receiving a message comprising information related to the content sample, and determining whether certain content is complete on the channel based on the received information.

24 Claims, 12 Drawing Sheets

(51) Int. Cl.
*H04N 21/488* (2011.01)
*H04N 21/422* (2011.01)
*H04N 21/472* (2011.01)
*H04N 21/4788* (2011.01)
*H04N 21/435* (2011.01)
*H04N 21/81* (2011.01)
*G06Q 10/10* (2012.01)
*G06Q 50/00* (2012.01)
*H04N 21/436* (2011.01)
*H04N 21/44* (2011.01)

(52) U.S. Cl.
CPC ..... *H04N 21/42204* (2013.01); *H04N 21/435* (2013.01); *H04N 21/436* (2013.01); *H04N 21/44008* (2013.01); *H04N 21/4788* (2013.01); *H04N 21/47214* (2013.01); *H04N 21/812* (2013.01)

(56) References Cited

U.S. PATENT DOCUMENTS

| | | | |
|---|---|---|---|
| RE44,090 E | | 3/2013 | Shobatake |
| 8,532,384 B2 | | 9/2013 | Howie |
| 2004/0066419 A1 | | 4/2004 | Pyhalammi |
| 2004/0214541 A1 | | 10/2004 | Choi |
| 2005/0213577 A1 | | 9/2005 | Shobatake |
| 2008/0062336 A1 | | 3/2008 | Dooms |
| 2008/0208974 A1 | | 8/2008 | Belimpasakis |
| 2008/0248779 A1 | | 10/2008 | Tsui et al. |
| 2008/0297669 A1 | | 12/2008 | Zalewski et al. |
| 2009/0222866 A1 | | 9/2009 | Jenzowsky |
| 2009/0228841 A1 | | 9/2009 | Hildreth |
| 2009/0228919 A1 | | 9/2009 | Zott et al. |
| 2009/0328085 A1* | | 12/2009 | Beyabani et al. ............ 725/9 |
| 2010/0058380 A1* | | 3/2010 | Yu .................. H04N 7/17318 725/34 |
| 2010/0061634 A1 | | 3/2010 | Howie |
| 2010/0198944 A1 | | 8/2010 | Ho et al. |
| 2010/0199299 A1* | | 8/2010 | Chang ............. H04N 7/17318 725/32 |
| 2010/0319015 A1* | | 12/2010 | Remington .......... H04H 20/10 725/19 |
| 2011/0065459 A1 | | 3/2011 | Cheng et al. |
| 2011/0119406 A1 | | 5/2011 | Chang et al. |
| 2011/0184960 A1 | | 7/2011 | Delpha et al. |
| 2011/0247042 A1* | | 10/2011 | Mallinson ................. 725/86 |
| 2011/0296339 A1 | | 12/2011 | Kang |
| 2012/0030553 A1 | | 2/2012 | Delpha et al. |
| 2012/0030702 A1* | | 2/2012 | Joao .................. 725/32 |
| 2012/0089923 A1* | | 4/2012 | Pettit ............... G06F 9/4445 715/746 |
| 2012/0265703 A1* | | 10/2012 | Basra ............... G06Q 10/10 705/319 |
| 2013/0041973 A1 | | 2/2013 | Zhou |
| 2013/0047180 A1* | | 2/2013 | Moon ............. H04N 21/4122 725/30 |
| 2013/0332834 A1 | | 12/2013 | Li et al. |
| 2013/0340018 A1 | | 12/2013 | Li et al. |
| 2013/0346508 A1 | | 12/2013 | Li et al. |
| 2014/0189042 A1 | | 7/2014 | Chen et al. |

FOREIGN PATENT DOCUMENTS

| | | |
|---|---|---|
| CN | 101505408 A | 8/2008 |
| CN | 101617308 A | 12/2009 |
| CN | 102075728 A | 5/2011 |
| JP | 2002-044193 A | 2/2002 |
| JP | 2004-333233 A | 11/2004 |
| JP | 2005-150831 A | 6/2005 |
| JP | 2006-203399 A | 8/2006 |
| JP | 2007-181153 A | 7/2007 |
| JP | 2008-079190 A | 4/2008 |
| JP | 2009-229605 A | 10/2009 |
| JP | 2010-141545 A | 6/2010 |
| JP | 2011-071879 A | 4/2011 |
| TW | 2008843483 A | 11/2008 |
| TW | 201106698 A1 | 2/2011 |
| WO | 03105351 | 12/2003 |
| WO | 2005026869 | 3/2005 |
| WO | 2005/107216 A1 | 11/2005 |
| WO | 2010025181 | 3/2010 |
| WO | 2010091089 A1 | 8/2010 |
| WO | 2010093510 | 8/2010 |
| WO | 2011-102886 A1 | 8/2011 |
| WO | 2011103886 | 8/2011 |
| WO | 2013/037083 A1 | 3/2013 |
| WO | 2013037080 | 3/2013 |
| WO | 2013037084 | 3/2013 |

OTHER PUBLICATIONS

International Search Report and Written Opinion received for PCT Application No. PCT/CN2011/085172, dated Sep. 27, 2012, 12 Pages.
International Search Report received for PCT Application No. PCT/CN2011/001550, dated Jun. 29, 2012.
International Search Report received for PCT Application No. PCT/CN2011/001546, dated Jun. 7, 2012.
Vatolin, et al, MSU TV Commercial Detector: downloaded from http://compression.ru/video/tv_commercial_detector/index_en.html.
Introduction to MythTV, downloaded from http://www.mythpvr.com/mythtv.
Duygulu, "Comparison and Combination of Two Novel Commercial Detection Methods", 2004 International Conference on Multimedia and Expo, Jun. 2004.
Law-To, "Video Copy Detection: a Comparative Study", CIVR'07, Jul. 2007, Amsterdam, The Netherlands.
"Evaluation of Face Recognition Algorithms", Colorado State University 2010.
Office Action received for Korean Patent Application No. 10-2014-7006555, dated Aug. 24, 2014, 2 pages of English Translation and 3 pages of Korean Office Action.
Office Action received for Japan Patent Application No. 2014-528819, dated Aug. 5, 2014, 2 pages of English Translation and 2 pages of Japan Office Action.
International Preliminary Report on Patentability and Written Opinion Received for PCT Patent Application No. PCT/CN2011/001546, dated Mar. 20, 2014, 6 pages.
International Preliminary Report on Patentability and Written Opinion Received for PCT Patent Application No. PCT/CN2011/001549, dated Mar. 20, 2014, 6 pages.
International Preliminary Report on Patentability and Written Opinion Received for PCT Patent Application No. PCT/CN2011/001550, dated Mar. 20, 2014, 6 pages.
International Preliminary Report on Patentability and Written Opinion Received for PCT Patent Application No. PCT/CN2011/085172, dated Jul. 10, 2014, 7 pages.
Office Action received for Taiwan Patent Application No. 101149596, dated Apr. 24, 2015, 11 pages of English Translation and 10 pages of Taiwan Office Action.
Supplementary European Search Report from related European Application 11878730.8 dated Jul. 8, 2015.
European Examination Report issued in European Application No. 11878730.8-1905, dated Feb. 21, 2017, 5 pages.

* cited by examiner

CONTENT-BASED CONTROL SYSTEM

TECHNICAL FIELD

This application relates to the technical fields of data processing, more specifically to methods and apparatuses associated with personalized video content consumption using shared video device and personal device.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in integrated circuit, computing, networking and other technologies, personal devices configured for use by a user, such as smartphones, tablet computers, and so forth, are increasingly popular. Concurrently, shared video devices configured for use by multiple users, such as televisions, or set-top boxes coupled to television remain popular, in part, because of their increased functionalities, such as high-definition video, surround sound, and so forth. Currently, except perhaps for the use of a personal device as a conventional remote control to a shared video device, there is little integration or cooperation between personal and shared video devices.

BRIEF DESCRIPTION OF THE DRAWINGS

Embodiments of the present invention will be described by way of exemplary embodiments, but not limitations, illustrated in the accompanying drawings in which like references denote similar elements, and in which.

Figure 1:
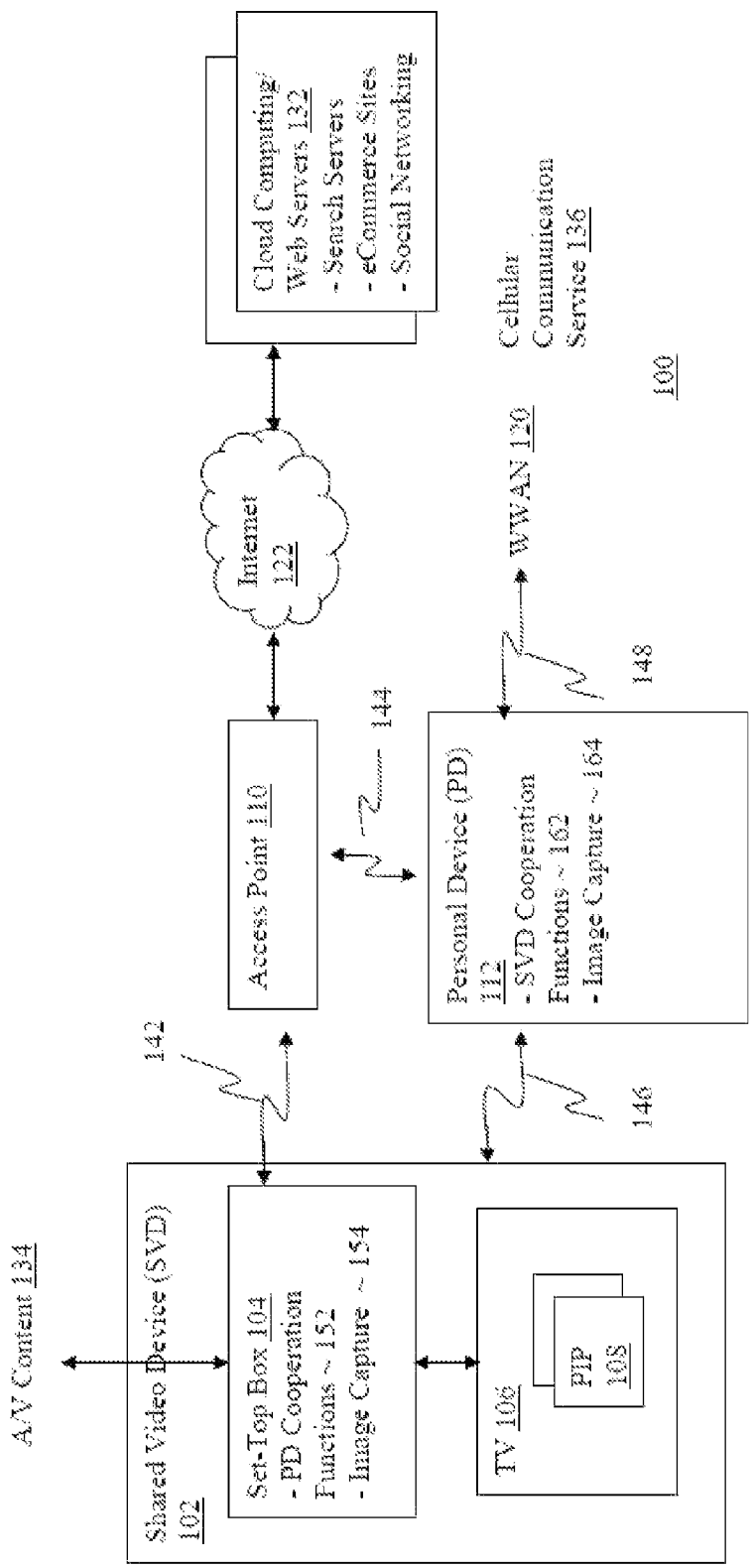
FIG. 1 is a block diagram illustrating an example shared and personal devices usage arrangement.

Although the following Detailed Description will proceed with reference being made to illustrative embodiments, many alternatives, modifications and variations thereof will be apparent to those skilled in the art.

DETAILED DESCRIPTION

Methods, apparatuses and storage medium associated with personalized video content consumption using shared and personal devices are disclosed herein. In various embodiments, a personal device (PD) method may include registering, by a personal device of a user, with a shared video device configured for use by multiple users, or associating the shared video device, by the personal device, with the personal device. The PD method may further include, after the registration or association, cooperating, by the personal device, with the shared video device to facilitate personalized video content consumption by the user.

For example, personalized video content consumption may include a content-based control method. Content-based control may be activated automatically (e.g., when a channel is changed in the shared video device) or manually by physical or code-based configuration, by a recognized gesture performed by the user, etc. Content-based control may cause content to be sampled from a channel, and the sample to be transmitted to a remote processing resource (e.g., a cloud server) for identification. The content samples may be transmitted on a predetermined or configured interval. The personal device may then receive a message indicating that certain content (e.g., advertisements) is determined to be complete on the channel. The personal device may then perform an activity based on the received message. Example activities include activating a user notification on the personal device, switching the shared video device back to the channel, etc.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The term "smartphone" as used herein, including the claims, refers to a "mobile phone" with rich functionalities beyond mobile telephony, such as, personal digital assistant (PDA), media player, cameras, touch screen, web browsers, Global Positioning System (GPS) navigation, WiFi, mobile broadband, and so forth. The term "mobile phone" or variants thereof, including the claims, refers to mobile electronic device used to make mobile telephone calls across a wide geographic area, served by many public cells.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "a selected one of A or B," as used herein refers to "A" or "B," and does not in any way imply or require a "selection" operation to be performed.

Referring now to FIG. 1, wherein a block diagram illustrating an example shared and personal devices usage arrangement, in accordance with various embodiments. As illustrated, arrangement 100 may include shared video device (SVD) 102 configured to receive and render audio/visual (A/V) content 134 for use by multiple users, and personal device (PD) 112 configured to provide various personal functions, such as mobile telephony, for use by a user. Further, SVD 102 and PD 112 may be respectively configured with PD cooperation functions 152 and SVD cooperation functions 162, to cooperate with each other to provide personalized video content consumption, to be described more fully below. Except for PD and SVD cooperation functions 152 and 162 provided in accordance with embodiments of the present disclosure, examples of SVD 102 may include a multiple device coupled combination of television 106 and set-top box 104, or a single device integrated combination of television 106 and set-top box 104, whereas, examples of PD 112 may include mobile phones, smartphones, laptop computers, notebook computers, ultrabooks, netbooks, tablet computers, etc. In various embodiments, television 106 may include a picture-in-picture (PIP) feature with one or more PIP 108, and set-top box 104 may include a digital image capture device 154, such as a camera. Likewise, PD 112 may also include a digital image capture device 164, such as a camera.

As illustrated, SVD 102 may be configured to be coupled to, and selectively receive A/V content 134 from one or more A/V content sources (not shown), whereas PD 112 may be configured to be wirelessly 148 coupled to cellular communication service 136, via wireless wide area network (WWAN) 120. Examples of A/V content sources may include, but are not limited to, television programming broadcasters, cable operators, satellite television programming providers, Internet-based programming providers, digital video recorders (DVR), compact disc (CD) or digital video disc (DVD) players, or video cassette recorders (VCRs). Cellular communication service 136 may be Code Division Multiple Access (CDMA) service, Enhanced GPRS (EDGE) service, 3G or 4G service (GPRS=General Packet Radio Service).

Still referring to FIG. 1, in various embodiments, SVD 102 and PD 112 may be wirelessly 142 and 144 coupled with each other, via access point 110. In turn, access point 110 may further couple SVD 102 and PD 112 to remote cloud computing/web servers 132, via one or more private or public networks, including e.g., the Internet 122. In other words, SVD 102, PD 112 and access point 110 may form a local area network, such as a home network. Remote cloud computing/web servers 132 may include search services, such as Google® or Binge, eCommerce sites, such as Amazon®, or social networking sites, such as Facebook® or MySpace®. Further, in various embodiments, SVD 102 and PD 112 may be respectively configured to enable the devices to be wirelessly 146 coupled using personal and/or near field communication protocols. In various embodiments, wireless couplings 142 and 144 may include WiFi connections, whereas wireless coupling 146 may include a Bluetooth connection. In various embodiments, PD cooperation functions 152 and SVD cooperation functions 162 may communicate with each other in accordance with the Transmission Control Protocol (TCP), User Diagram Protocol or other message protocols.

In various embodiments, SVD 102 and PD 112 may have respectively associated identifiers. For the embodiments, where SVD 102 includes television 106 with PIP 108, SVD 102 may further include logical identifiers respectively identifying the main picture and the PIP 108. Additionally, in various embodiments, the identifiers may be respectively included in at least discovery communications transmitted by SVD 102 and PD 112, to enable receivers of the communications, such as PD 112 and SVD 102, to be able to discern the senders of the communications.

Figure 2:
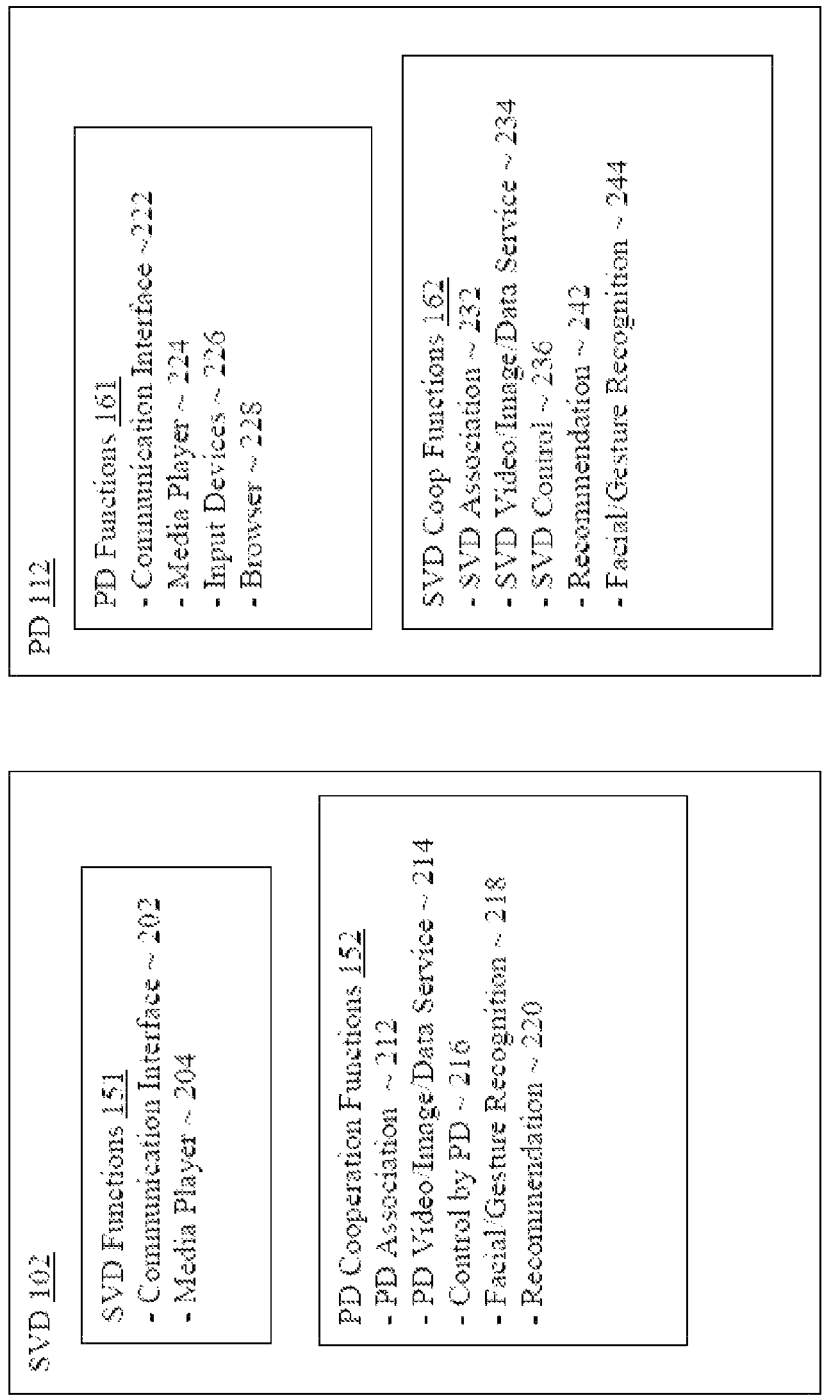
FIG. 2 illustrates one example each of a shared video device and a personal device in further detail.

FIG. 2 illustrates one example each of SVD 102 and PD 112 in further detail, in accordance with various embodiments. As shown and described earlier, SVD 102 may include SVD functions 151 and PD cooperation functions 152, whereas PD 112 may include PD functions 161 and SVD cooperation functions 162.

In various embodiments, SVD functions 151 may include one or more communication interfaces 202, having respective transceivers, and media player 204, having one or more A/V decoders. Communication interfaces 202, having respective transceivers, may include, but are not limited to, a communication interface configured to receive A/V content from a television programming broadcaster, a cable operator, or a satellite programming provider, an Internet-based programming provide, a communication interface configured to receive A/V content from a DVR, CD/DVD/Blu-ray player or a VCR, a communication interface configured to communicate with access point 110, and/or a communication interface configured to directly communicate with PD 112. Media player 204, having one or more A/V decoders, may be configured to decode and render various A/V content streams. The various A/V decoders may be configured to decode A/V content streams of various formats and/or encoding schemes.

In various embodiments, PD cooperation functions 152 may include a PD registration/association function 212, a PD video/image/data service 214 and a control by PD function 216. Further, PD cooperation functions 152 may include facial/gesture recognition function 218 and recommendation function 220.

PD registration/association function 212 may be configured to register SVD 102 with a PD 112 or associate PD 112 with SVD 102. In various embodiments, registration/association function 212 may be configured to register/associate SVD 102 with a PD 112 by exchanging messages with identification and/or configurations. In alternate embodiments, registration/association function 212 may be configured to register/associate SVD 102 with a PD 112, in cooperation with facial/gesture recognition service 218, using a facial recognition service. In various embodiments, registration/association function 212 may be configured to maintain a map of the PD 112 with whom SVD 102 is registered and/or associated. For various set-top box 104 and television 106 embodiments, where television 106 includes a PIP feature with one or more PIP 108, PD registration/association function 212 may be configured to register SVD 102 with a PD 112 or associate SVD 102 with a PD 112, at a PIP granularity level, to enable video streams rendered in the main picture and PIP 108 to be logically associated with different PD 112. Further, PD registration/association function 212 may be configured to maintain the earlier described SVD 102 to PD 112 map at a PIP granularity level. In various embodiments, PD registration/association function 212 may be further configured to maintain the map to include a current status of the user of the PD 112, e.g., whether the user is among the current users of SVD 102. PD registration/association function 212 may be configured to update the status as the user becomes a current user of SVD 102 (or one of the current users of SVD 102), or ceases to be a current user of SVD 102.

PD video/image/data service 214 may be configured to enable SVD 102 to exchange, with PD 112, video, image and/or data (e.g., metadata, audio clips/samples, etc.) associated with a video stream being rendered on SVD 102. The video, image and/or data associated with a video stream, provided to PD 112 by SVD 102, may be captured by SVD 102, or obtained from another third party. In particular, PD video/image/data service 214 may be configured to capture image clips, video clips, audio clips, etc. from a video stream being rendered on SVD 102 or to capture an image from a camera of SVD 102. In addition to providing to PD 112, the captured image, video clip, metadata, audio clips/samples, etc. may be stored and/or provided to PD 112.

Further, PD video/image/data service 214 may be configured to provide captured image clips, video clips, audio clips, etc. from a video stream to a cloud computing server to identify the video stream (e.g., via video search, image search, audio finger search, etc.), and/or to obtain metadata associated with the video stream. The metadata may be provided by the video stream creator/owner, distributor or associated advertisers. The metadata associated with the video stream may also be stored or provided to PD 112. Further, the viewing history may be stored on SVD 102.

Control by PD function 216 may be configured to accept controls from PD 112, and in response, control SVD 102 accordingly, to facilitate personalized video consumption. Controls may include, but are not limited to, controlling capturing of an image from a video stream being rendered on SVD 102, or controlling rendering of a video stream on SVD 102, such as stopping, pausing, forwarding or rewinding the video stream. Control by PD function 216 may also be configured to accept controls from PD 112, to control the rendering parameters of a 3DTV video stream on SVD 102, to monitor the quality of the 3DTV images rendered, etc. Parameter controls may include controlling depth range of 3D video. Quality monitoring may include monitoring for problems such as the existence of non-horizontal parallax, hyper-convergence, color inconsistency between the left/right views, synchronization issues, etc.

Facial/Gesture Recognition service 218 may be configured to provide a number of facial recognition and/or gesture recognition services. Facial recognition services may include recognition of faces in a picture, including age, gender, ethnicity, and so forth. Facial recognition services may further include recognition of facial expressions, e.g., approved, disapproved, interested, disinterested, happy, sad, angry or at peace. Facial recognition may be based on one or more facial or biometric features. Gesture recognition services may include recognition of a number of hand gestures, including but are not limited to, a thumb up hand gesture denoting "like," a thumb down hand gesture denoting "dislike," two fingers moving away from each other denoting "enlarge," two fingers moving towards each other denoting "shrink," two fingers or two hands crossing each other denoting "swap".

Recommendation function 220 may be configured to, individually or in combination with recommendation function 242, provide a user of PD 112 with personalized recommendations based on interactions/cooperation with PD 112, using SVD 102, and/or between SVD cooperation functions 162 and PD functions 161. Personalized recommendations may be other contents, other web sites, other advertisements, other goods, etc. of potential interest to the user of PD 112.

In various embodiments, PD registration/association function 212 may be configured to cooperate with facial/gesture recognition function 218 to effectuate registration of SVD 102 or logical units of SVD 102 (e.g., PIP 108, if SVD 102 includes television 106 with PIP 108) with various PD 112, or association of various PD 112.

The term "association" as used herein refers to a relationship between two entities, e.g., SVD 102 and PD 112, whereas the term "registration" as used herein refers to an action of one entity with another entity, e.g., an "action" for the purpose of forming an "association" between the entities. In other words, the present disclosure anticipates an "association" between SVD 102 and PD 112 may be formed unilaterally or bilaterally. For example, SVD 102, by virtue of its knowledge of a particular PD 112, such as its identification, may unilaterally consider the particular PD 112 be associated with the SVD 102, without itself registering with the particular PD 112 or requiring the particular PD 112 to register with itself. On the other hand, SVD 102 and/or PD 112 may explicitly identify themselves to each other ("register") to form the association.

Continue to refer to FIG. 2, in various embodiments, PD functions 161 may include one or more communication interfaces 222, having respective transceivers, media player 224, having one or more A/V decoders, input devices 226, and browser 228. Communication interfaces 222 may include a communication interface configured to communicate with a cellular communication service, a communication interface configured to communicate with access point 110, and/or a communication interface configured to directly communicate with SVD 102. Media player 224, having one or more A/V decoders, may be configured to decode and render various A/V content streams. The various A/V decoders may be configured to decode A/V content streams of various formats and/or encoding schemes.

Input devices 226 may be configured to enable a user of PD 112 to provide various user inputs. Input devices 226 may include a keyboard (real or virtual) to enable a user to provide textual input, and/or a cursor control device, such as a touch pad, a track ball, and so forth. In various embodiments, input devices 226 include video and/or touch sensitive screen to enable a user to provide a gesture input. Gesture inputs may include the same or different hand gesture described earlier with respect to facial/gesture recognition service 218.

Browser 228 may be configured to enable a user of PD 112 to access a remote search service, an e-commerce site or a social network on the Internet. Examples of a search service may include Google®, Binge and so forth. An e-commerce site may include Amazon®, Best Buy® and so forth. Social network may include Facebook®, MySpace®, and so forth. Browser 228 may also be configured to enable the user of PD 112 to participate in a Special Interest Group (SIG) associated with the program of a video stream being rendered on SVD 102. Such SIG may be pre-formed or dynamically formed based on current content being delivered by a content provider. Such SIG may also be geographically divided, or by PD device types.

In various embodiments, SVD cooperation functions 162 may include a SVD registration function 232, a SVD video/ data service 234, and a SVD control function 236. SVD cooperation functions 162 may further include recommendation function 242, and facial/gesture recognition service 244.

SVD registration/association function 232, similar to PD registration/association function 212 of SVD 102, may be configured to register PD 112 with a SVD 102, or associate SVD 102 with PD 112. For various set-top box 104 and television 106 embodiments, where television 106 includes a PIP feature, SVD registration function 232 may be configured to register PD 112 with a SVD 102, or associate SVD 102 with PD 112, at a PIP granularity level, to enable video streams rendered in the main picture and PIP 108 to be independently associated with the same or different PD 112.

SVD video/image/data service 234, similar to PD video/image/data service 214 of SVD 102, may be configured to exchange with SVD 102, video, image and/or data (e.g., metadata, audio clips/samples, etc.) associated with a video stream being rendered on SVD 102. Similarly, SVD video/image/data service 234 may be configured to send and/or accept video, image and/or data to/from a cloud computing server. SVD video/image/data service 234 may be configured to cooperate with browser 228 to effectuate the send and accept of video, image and/or data to/from a cloud computing server.

SVD Control 236 may be configured to provide controls to SVD 102 to control SVD 102. As described earlier, with respect to Control by PD 216 of SVD 102, controls may include, but are not limited to, enlarging or shrinking a PIP 108, swapping video streams between the main picture and a PIP 108, stop, pause, fast forward or rewind a video stream. SVD Control 236 may also be configured to provide controls to SVD 102 to adjust the rendering of a 3DTV video stream on to control SVD 102, to control its quality. Further, SVD Control 236 may be configured to provide automatic video stream switching during commercials, and automatic switch backs, when the commercials are over. SVD Control 236 may also be configured to provide controls to SVD 102, to adjust the rendering of a 3DTV video stream on SVD 102, to control the quality of the 3DTV images rendered. Controls may include control of relative depth between the component images, control to reduce color and/or sharpness distortion of edges.

Recommendation function 242, similar to recommendation function 220 of SVD 102, may be configured to, individually or in combination with recommendation function 220, provide a user of PD 112 with personalized video content recommendations based on the interactions/cooperation with SVD 102, using PD 112, and/or between PD functions 161 and SVD cooperation functions 162. Recommendation function 242 may be further configured to employ other data available on PD 112, for example, trace data, such as location visited, recorded by a GPS on PD 112.

Before continuing with further description, it should be noted while embodiments of SVD 102 and PD 112 were illustrated in FIG. 2, with both devices respectively having recommendation functions 220 and 242, and facial/gesture recognition services 218 and 244, other embodiments may be practiced with only one or none of SVD 102 and PD 112 having a recommendation function or facial/gesture recognition service. Similarly, while for ease of understanding, video/image/data services 214 and 234, and facial/gesture recognition services 218 and 244 have been described as combined services, in alternate embodiments, the present disclosure may be practiced with one or both of these services sub-divided into separate services, e.g., video/image/data service sub-divided into separate video, image and data services, or facial/gesture recognition service subdivided into separate facial, and gesture recognition services.

Accordingly, on registration or association, PD cooperation function 152 and SVD cooperation function 162 may cooperate to facilitate personalized video content consumption by a user of PD 112. For example, control by PD function 216 and SVD control function 236 may cooperate to enable a user of PD 112 to control operations of SVD 102. More specifically, with facial/gesture recognition service recognizing a particular user gesture, control by PD function 216 and SVD control function 236 may cooperate to respond and enable a segment of a video stream being rendered on SVD 102 be re-played on PD 112. Further, in response to a recognition of another user gesture input, control by PD function 216 and SVD control function 236 may cooperate to enable a video stream being rendered on SVD 102 to stop, pause, fast forward or rewind. Similarly, in response to a recognition of still another gesture, control by PD function 216 and SVD control function 236 may cooperate to enable a PIP 108 of SVD 102 be enlarged or shrunk, or two video streams being rendered in a main picture and in a PIP 108 be swapped.

As still another example, recommendation function(s) 220 and/or 242, individually or in combination, may be employed to analysis past interactions or cooperation, and make various recommendations, such as, other video content to be viewed on SVD 102, other web sites or content to be visited/browsed on PD 112, and/or other items to be purchased.

Figure 3:
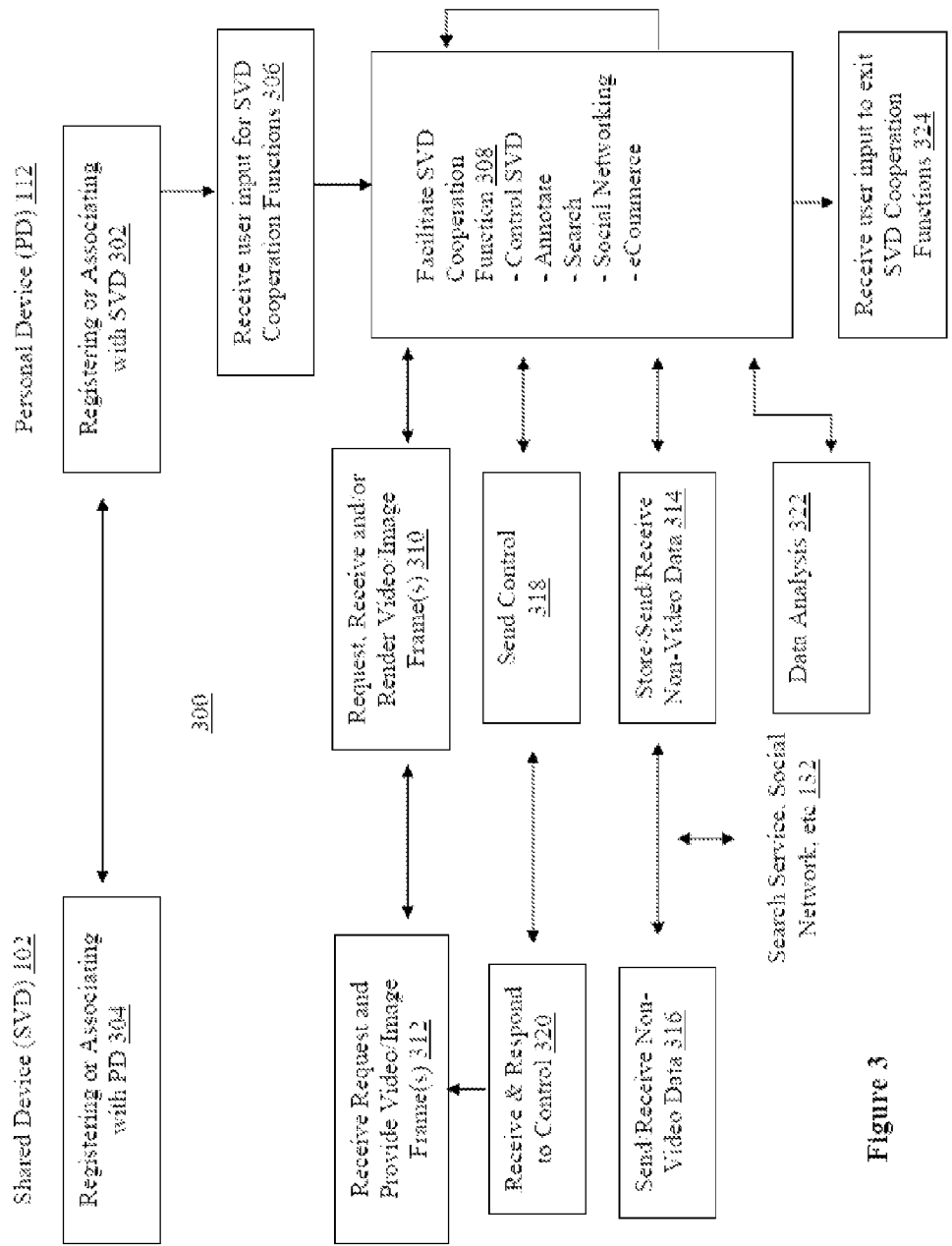
FIG. 3 illustrates an example method of personalized video content consumption using shared and personal devices.

FIG. 3 illustrates an example method of personalized video content consumption using shared and personal devices, in accordance with various embodiments. As illustrated, method 300 may begin at block 302 and/or 304 with SVD 102 and/or PD 112 register or associate with each other, to be described more fully below, with references to FIG. 4. In various embodiments, method 300 may be practiced with PD 112 registering itself with SVD 102 or otherwise associating SVD 102 to itself. In other embodiments, method 300 may be practiced with SVD 102 registering itself with PD 112 or otherwise associating PD 112 with itself. In still other embodiments, method 300 may be practiced with SVD 102 and PD 112 registering or otherwise associating themselves with each other.

In various embodiments, SVD 102 and PD 112 may also exchange configuration information, as part of the registration process, to facilitate subsequent communications. For example, SVD 102 and PD 112 may exchange their respective capability information, such as, processing power, encoding/decoding schemes supported, messaging protocols supported, and so forth. In various embodiments, SVD 102 and/or PD 112 may also be configured, as part of the registration process, to cause required software and/or updates to be pushed to and/or installed on the other device.

On registration or association, method 300 may proceed to block 306 where PD 112 may receive an indication or a selection from a user of PD 112 to have SVD 102 and PD 112 cooperate to provide personalized user functions. From block 306, method 300 may proceed to block 308, where PD 112 may cooperate with SVD 102 to facilitate cooperative provision of personalized user functions to the user.

At block 308, a control of SVD 102 may be received. As described earlier, the control may be inputted via a gesture of the user of PD 112. The control, as described earlier, may include, but is not limited to, requesting a replay of a segment of a video stream being rendered on SVD 102 on PD 112, requesting SVD 102 to stop, pause, fast forward or rewind a video stream being rendered on SVD 102, requesting an enlargement or shrinking of a PIP 108, and/or requesting the main picture and a PIP 108 be swapped. On receipt of the control, method 300 may proceed from block 308 to block 318, then onto block 320 to cause the control be sent from PD 112 to SVD 102, and the control be processed and responded to on SVD 102. From block 320, if the control is to replay a video segment on PD 112, method 300 may return to block 308 via blocks 312 and 310, otherwise, method 300 may return to block 308, via block 318.

Additionally, or in lieu of the earlier described operations, at block 308, method 300 may proceed to block 322, where analysis of historical video content consumption, user actions associated with the video content consumed, interactions/cooperation between SVD 102 and PD 112 may be performed, and personalized recommendations for other content consumption or user actions may be presented to the user of PD 112.

Thereafter, the above described operations may be repeated, in response to various further user inputs. Eventually, method 300 may proceed from block 308 to block 324, wherein a user input to exit the cooperative provision of user function may be received. On receipt of such input, method 300 may terminate.

In various embodiments, in addition to facilitating personalized video content consumption by the user of PD 112, using both SVD 102 and PD 112, method 300 may also include SVD 102 and PD 112 cooperative to provide personalized user functions. Examples of such personalized user functions may include annotation of images and/or objects within the images associated with video content consumed, performing online searches, interacting with social network, and/or conduct e-commerce transactions, based on or resulted as least in part because of images and/or objects within images associated with video content consumed. For such cooperative personalized user function provision, method 300 may further transitions from block 308 to blocks 310 and 312, and back, or to blocks 314 and 316 and back. Cooperative personalized user function provision is the subject of PCT/CN2011/001550 filed Sep. 12, 2011 and U.S. application Ser. No. 13/995,488 filed Sep. 10, 2013. For further details, refer to the co-pending application.

Figure 4:
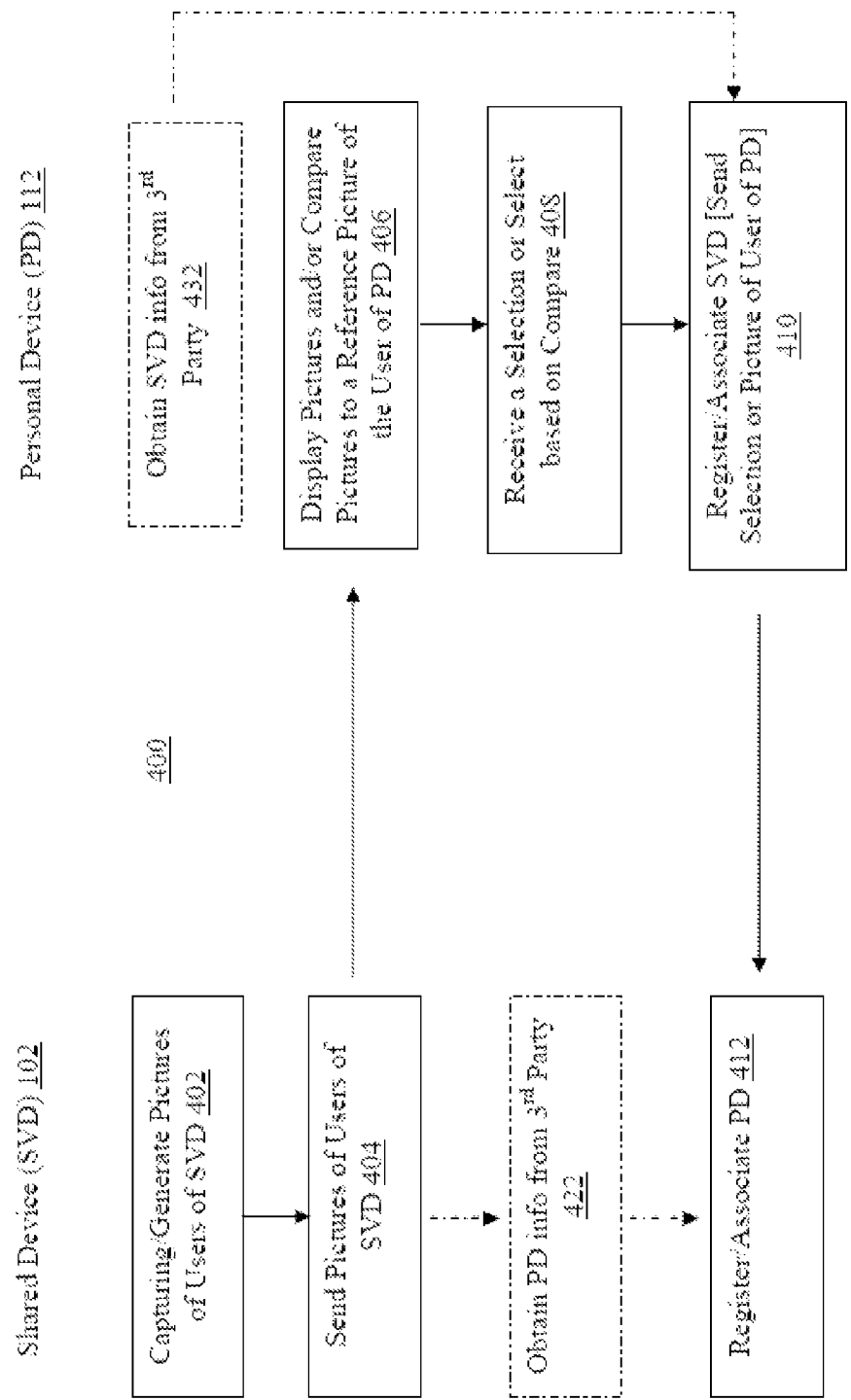
FIG. 4 illustrates various examples of facial recognition based methods of registration and/or association between the shared and personal devices.

FIG. 4 illustrates various examples of facial recognition based methods of registration and/or association between the shared and personal devices, in accordance with various embodiments. As illustrated, method 400 may begin e.g., at block 402, with SVD 102 (equipped with an image capturing device, such as, a camera) capturing pictures of its users. In various embodiments, SVD 102 may capture pictures of its users by capturing a picture of the space in front SVD 102, and then analyze the picture (using e.g., facial/gesture recognition service 218) for faces of users. On identifying new user faces, SVD 102 (using e.g. registration/association function 212) may generate pictures of the new users. SVD 102 may perform the capture and generate operations periodically, e.g., on power on, and therefore periodically on a time basis or on an event driven basis, e.g. on changing of the video stream being rendered or on changing of the genre of the video stream being rendered.

From block 402, method 400 may proceed to block 404, where SVD 102, in response to detection of PD 112 or contact by PD 112, may send pictures of users of SVD 102 to PD 112. From block 404, method 400 may proceed to block 406, where PD 112, for certain "manual" embodiments, may display the received pictures for a user of PD 112 to confirm whether one of the received pictures is a picture of the user of PD 112. Alternatively, PD 112, for certain "automated" embodiments, using e.g., facial/gesture recognition service 244, may compare the received pictures with a reference picture of the user of PD 112. The reference picture of the user of PD 112 may be previously provided to PD 112, or captured by PD 112 (for embodiments equipped with an image capture device, such as, a camera).

From block 406, method 400 may proceed to block 408, where PD 112, for the "manual" embodiments, may receive a selection of one of the received pictures from the user of PD 112, indicating the selected picture of the user of SVD 102 corresponds to the user of PD 112. For the "automated" embodiments, PD 112 may select one of the received pictures that substantially match the reference picture.

From block 408, method 400 may proceed to block 410, where PD 112 may associate itself with SVD 102. In associating itself with SVD 102, PD 112 may send the selection info (provided by the user or by the comparison operation) to SVD 102 to register itself with SVD 102 (or a logical unit of SVD 102, such as, a PIP 108 of a television 106 of SVD 102).

From block 410, method 400 may proceed to block 412, where SVD 102 may respond to the provided selection, and associate itself with PD 112, including, associating the user of the selected picture with PD 112. In various embodiments, where PD 112 also maintains a map of the various SVD 102 it is associated with (such as a SVD 102 at the primary residence, a SVD 102 at the beach house, and so forth), in response, SVD 102 may register itself with PD 112.

In alternate embodiments, from block 404, method 400 may proceed to block 422 instead, where at block 422, SVD 102 may contact an external source, e.g., a cloud computing server, to obtain identification and/or configuration information of PD 112, using the captured/generated pictures of its users. From block 422, method 400 may proceed to block 412, where SVD 102 may associate itself with all PD 112 it was able to obtain at least identification information, including, respectively associating the user pictures with the PD 112 it was able to obtain identification information based on the user pictures.

In alternate embodiments, method 400 may also begin at block 432 instead, with PD 112, contacting an external source, e.g., a cloud computing server, to obtain identification and/or configuration information of SVD 102. If successful, from block 432, PD 112 may proceed to block 410, where PD 112 associates SVD 102 to itself. At block 410, PD 112, may register itself with SVD 102. From block 410, method 400 may proceed to block 412, as described earlier.

Figure 5:
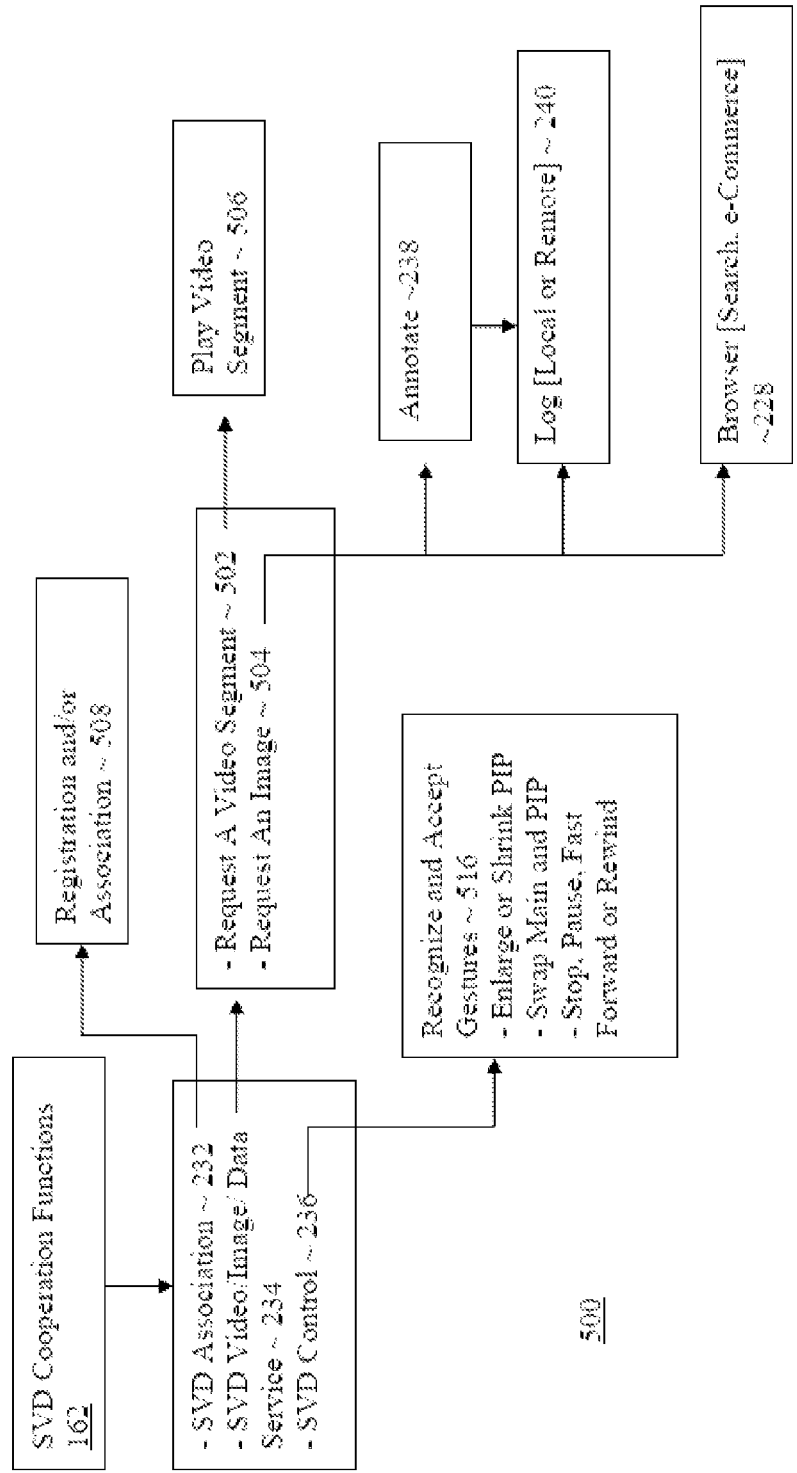
FIG. 5 illustrates a user view of an example personalized video content consumption using shared and personal devices.

FIG. 5 illustrates a user view of an example cooperative personalized user function provision by shared and personal devices, in accordance with various embodiments of the present disclosure. As illustrated, initially, the example cooperative personalized user function provision 500 may present the user of PD 112 with the option, via, e.g., an icon displayed on PD 112, to launch SVD cooperative functions 162. In response to the selection of the option, the user of PD 112 may be presented with the options of selecting SVD registration/association function 232, or SVD Control 236 for facilitating personalized video content consumption. In various embodiments, the user of PD 112 may be further presented with the option of SVD video/image/data service 234.

On selection of SVD registration/association function 232, various registration and/or association operations 508, such as message based or facial recognition based registration/association, as earlier described, may be performed. On selection of SVD Control function 236, the user of PD 112 may be provided with the gesture recognition function 516 to receive and accept gestures to control SVD 102, e.g., to enlarge or shrink a PIP 108, to swap two video streams between the main picture and a PIP 108, or to stop, pause, fast forward or rewind a video stream being rendered on SVD 102.

Figure 6:
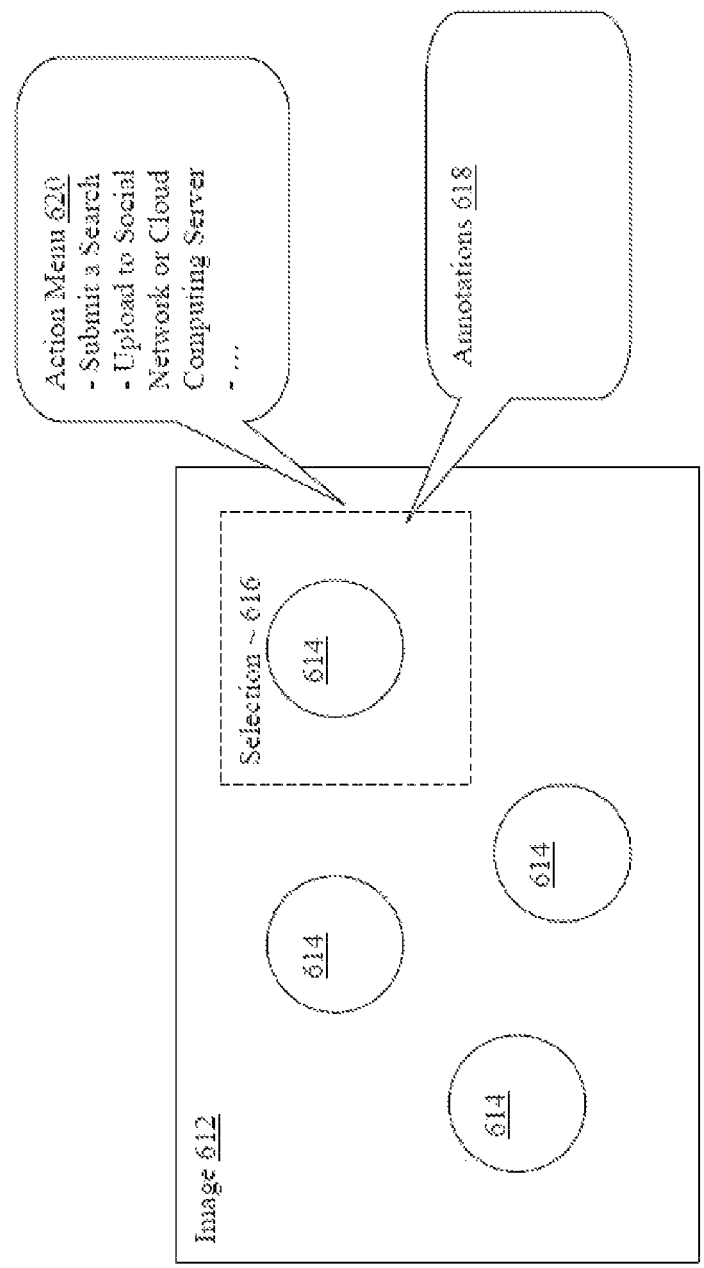
FIG. 6 illustrates a user view of selected cooperative personalized user function provision by the shared and personal devices.

In embodiments where the option of SVD video/image/data service 234 is also provided, on selection of SVD video/image/data service 234, the user of PD 112 may be presented with the options of requesting 502 a video segment of a video stream being rendered on SVD 102, or requesting 504 an image frame of a video stream being rendered on SVD 102. On selection of either requesting 502 or requesting 504, the requested video segment may be played 506, the image frame or one or more objects there may be annotated 238, and/or stored 240, with or without annotation. Further, various browser 228 related functions may be performed. FIG. 6 illustrates a user view of annotating an image or an object within, in accordance with various embodiments of the present disclosure. Shown in FIG. 6 is an image 612 with objects 614, one of which is selected 616, and having a pop-up area 618 for entering annotations, and a pop-up menu 620 with various function options cooperatively provided by SVD 102 and PD 112. These features are the subjects of the Related Applications identified above. For further details, refer to the Related Applications identified above.

Figure 7:
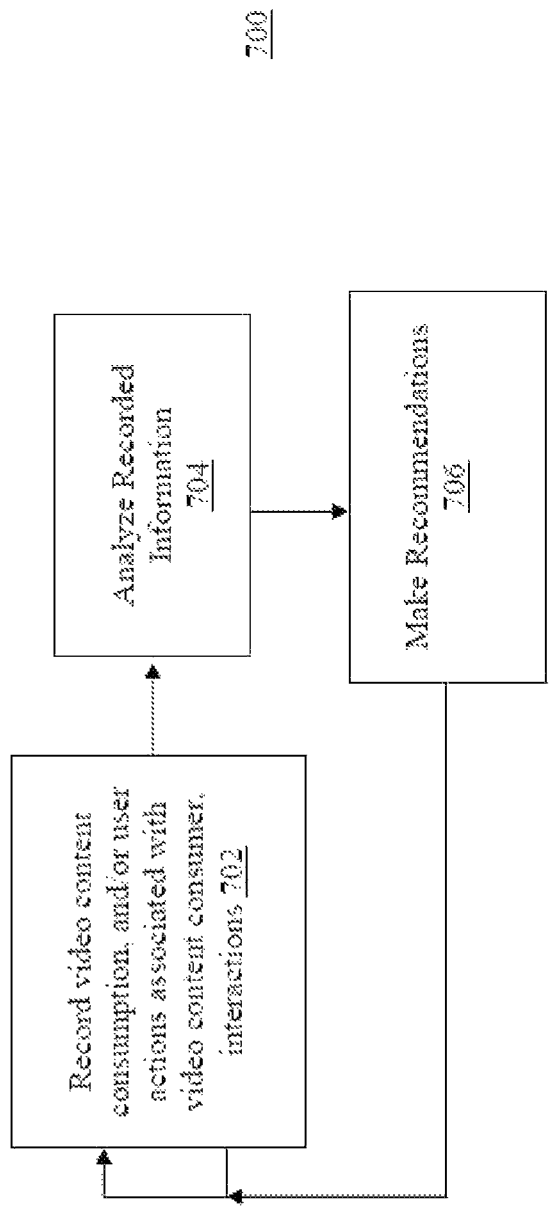
FIG. 7 illustrates an example method of cooperative personalized recommendation by the shared and personal devices.

FIG. 7 illustrates an example of cooperative personalized recommendation by shared and personal devices, in accordance with various embodiments of the present disclosure. As illustrated, method 700 may start at block 702 with PD 112, by itself or in cooperation with SVD 102, wherein video content consumption, user actions associated with video content consumed, the interactions and cooperation between PD 112 and SVD 102, may be recorded, and saved in PD 112, SVD 102, or a cloud computing server. The operations of block 702 may be continuous.

From block 702, periodically, method 700 may proceed to block 704, where SVD 102 and/or PD 112, individually or in combination, may analyze the stored information. From block 704, method 700 may proceed to block 706, wherein SVD 102 or PD 112 may make personalized video content and/or other related recommendations to the user of PD 112, based at least in part on the result of the analysis. As described earlier, the personalized recommendations may include personalized recommendation of a video stream, a web site, and so forth.

From block 706, method 700 may return to block 702, and proceed therefrom as described earlier.

Figure 8:
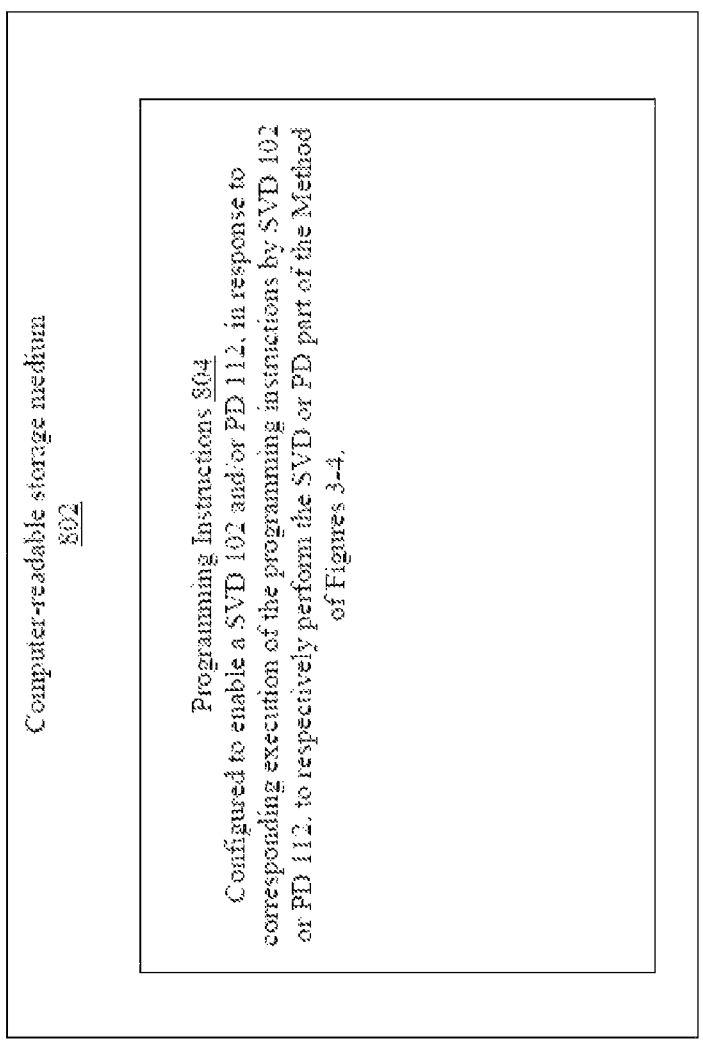
FIG. 8 illustrates an example non-transitory computer-readable storage medium having instructions configured to practice all or selected aspects of the methods of FIGS. 3-4.

FIG. 8 illustrates a non-transitory computer-readable storage medium, in accordance with various embodiments of the present disclosure. As illustrated, non-transitory computer-readable storage medium 802 may include a number of programming instructions 804. Programming instructions 804 may be configured to enable a SVD 102 or a PD 112, in response to corresponding execution of the programming instructions by SVD 102 or PD 112, to perform operations of the SVD or PD portion of methods 300-400 earlier described with references to FIGS. 3 and 4. In alternate embodiments, the programming instructions may be disposed in two or more storage medium instead.

Figure 9:
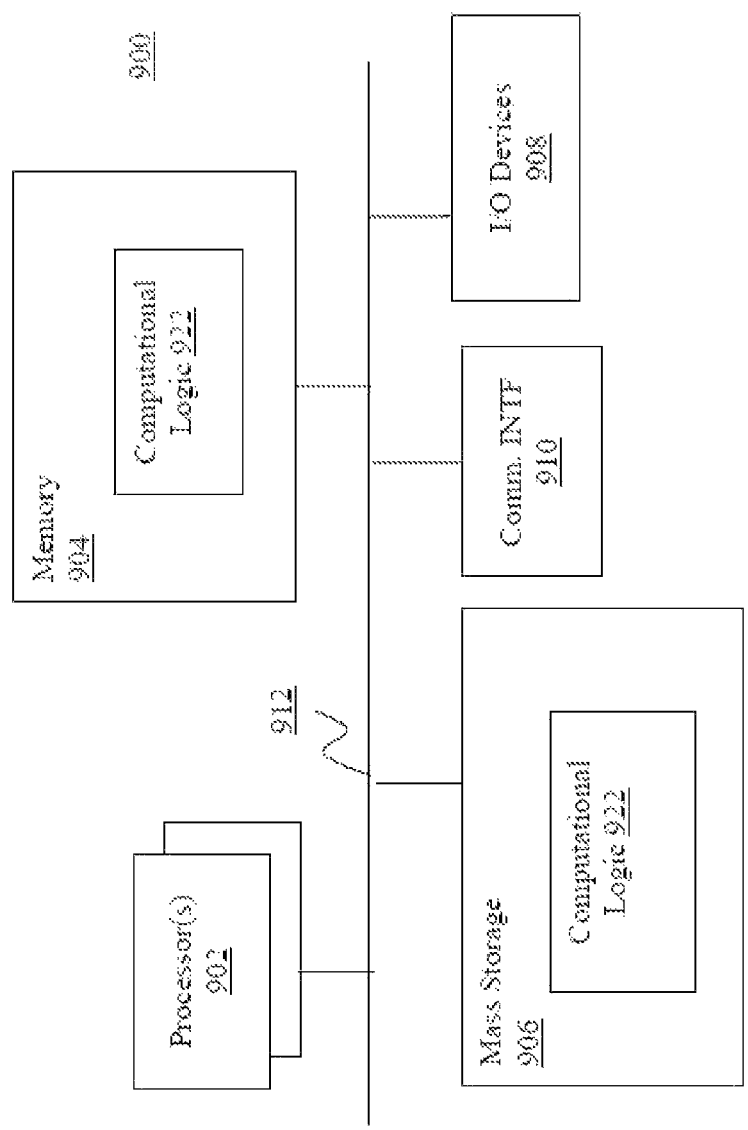
FIG. 9 illustrates an example computing environment suitable for use as a shared or personal device.

FIG. 9 illustrates an example computer system suitable for use as a SVD or a PD in accordance with various embodiments of the present disclosure. As shown, computing system 900 includes a number of processors or processor cores 902, and system memory 904. For the purpose of this application, including the claims, the terms "processor" and "processor cores" may be considered synonymous, unless the context clearly requires otherwise. Additionally, computing system 900 includes mass storage devices 906 (such as diskette, hard drive, compact disc read only memory (CD-ROM) and so forth), input/output devices 908 (such as display, keyboard, cursor control, touch pad, camera, and so forth) and communication interfaces 910 (such as, WiFi, Bluetooth, 3G/4G network interface cards, modems and so forth). The elements are coupled to each other via system bus 912, which represents one or more buses. In the case of multiple buses, they are bridged by one or more bus bridges (not shown).

Each of these elements performs its conventional functions known in the art. In particular, system memory 904 and mass storage 906 may be employed to store a working copy and a permanent copy of the programming instructions implementing the SVD or PD portion of methods 300-400 earlier described with references to FIGS. 3 and 4, that is PD cooperation functions 152 or SVD cooperation functions 162, or portions thereof, herein collectively denoted as, computational logic 922. Computational logic 922 may further include programming instructions to practice or support SVD functions 151 or PD functions 161, or portions thereof. The various components may be implemented by assembler instructions supported by processor(s) 902 or high-level languages, such as, for example, C, that can be compiled into such instructions.

The permanent copy of the programming instructions may be placed into mass storage 906 in the factory, or in the field, through, for example, a distribution medium (not shown), such as a compact disc (CD), or through communication interface 910 (from a distribution server (not shown)). That is, one or more distribution media having an implementation of computational logic 922 may be employed to distribute computational logic 922 to program various computing devices.

The constitution of these elements 902-912 are known, and accordingly will not be further described.

Content-Based Control

Content-based control (CBC), as referenced herein, may include controlling the operation of devices in arrangement 100 based on a determination of content that is airing on a channel. A channel, as referenced herein, may be defined as a stream of incoming content associated with a content provider. Examples of content providers that may be associated with channels include, but are not limited to, television programming broadcasters, cable operators, satellite television programming providers, Internet-based programming providers, etc.

Many content providers broadcast advertisements on their channels. While advertisements may be inconvenient and/or annoying for users, content providers realize income from including advertisements. Therefore, there is no incentive for content providers to eliminate or even limit the amount of advertisements on a channel. If users are not interested in advertisements, the time when the advertisements are airing on a channel may be spent viewing other content, surfing the Internet, etc. In one embodiment advertisements may be detected and monitored, allowing a user to pursue other activities while the advertisements are airing on the channel, and to be notified when the advertisements are complete so that viewing of content on the channel may continue.

Figure 10:
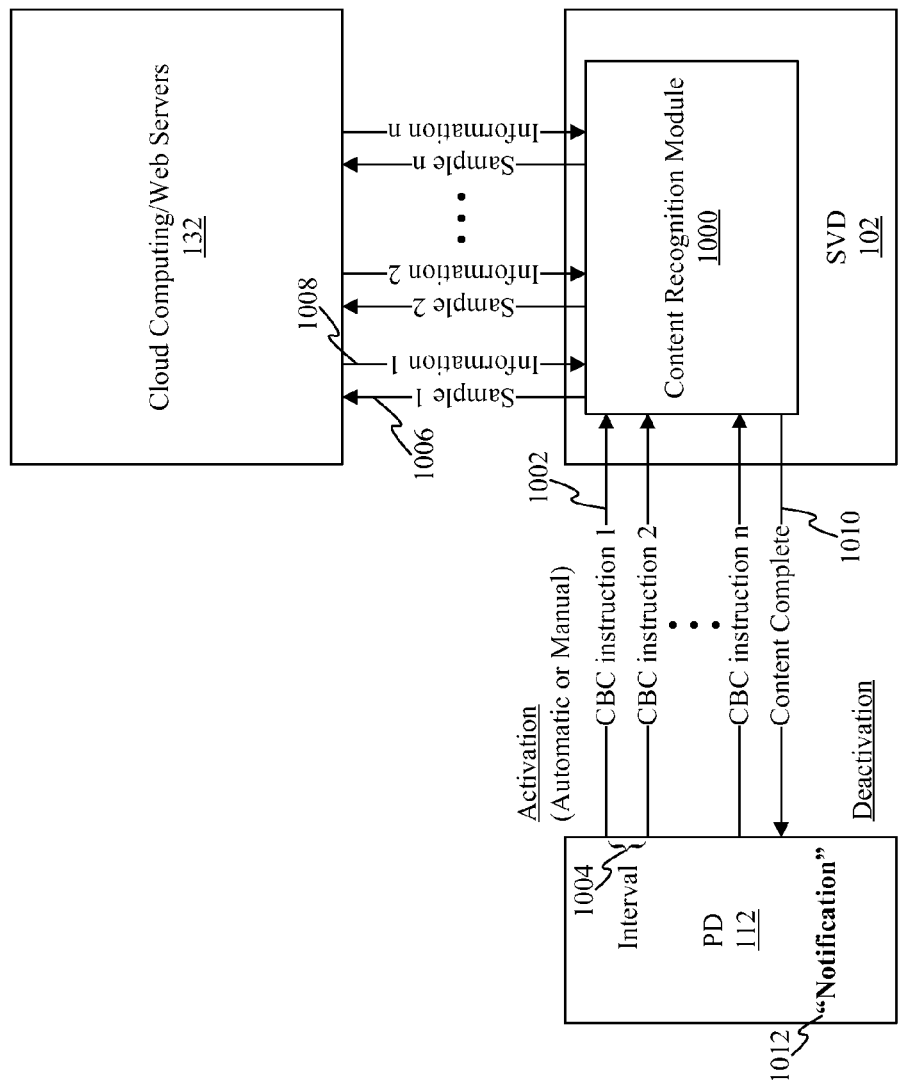
FIG. 10 illustrates an example of content-based control (CBC) in accordance with at least one embodiment.

FIG. 10 illustrates an example of content-based control (CBC) in accordance with at least one embodiment. PD 112 may be configured to interact with content recognition module 1000 in SVD 102, for example, via wireless coupling 146 (illustrated in FIG. 1, omitted in FIG. 10 for clarity). Content recognition module 1000 may also be configured to interact with cloud computing/web servers 132, for example, via access point 110 and Internet 122 (illustrated in FIG. 1, omitted in FIG. 10 for clarity). CBC may be activated automatically or manually in PD 112. For example, automatic activation may occur when PD 112 senses that the channel being viewed on SVD 102 has changed. Sensing channel changes may be performed by, for example, Control by PD function 216 (e.g., as illustrated in FIG. 2). Manual activation may include the configuration of a physical interface (e.g., pressing a button) or code-based button, switch, etc. in PD 112. Manual activation may also include Facial/Gesture Recognition Service 218 (e.g., as illustrated in FIG. 2) recognizing that a particular facial expression, hand gesture, etc. made by the user is associated with the activation of CBC in PD 112.

Activation of CBC may cause PD 112 to transmit CBC instructions 1002 (e.g., CBC instruction 1, CBC instruction 2 . . . CBC instruction n) instructing content to be sampled on a channel (e.g., in order to determine when certain content is complete on the channel). CBC instructions 1002 may be transmitted by PD 112 on an interval 1004 such as, for example, every ten seconds. Interval 1004 may be predetermined, may be configured automatically (e.g., based on device processing capacity and/or communication bandwidth availability), may be configured manually by a user in PD 112 or SVD 102, etc. In one embodiment, CBC instructions 1002 may identify the channel to sample (e.g., the channel that was being viewed on SVD 102 when CBC was activated). In the same or another embodiment, CBC instructions 1002 may further identify the certain content (e.g., the content on which control will be based). The certain content may be identified by name, subject matter, type (e.g., advertisements), etc. Alternatively, the certain content may be defined in content recognition module 1000 (e.g., if control is always based on advertisements), may be configured by a user in PD 112 or SVD 102, etc. Content recognition module 1000 may receive CBC instructions 1002, may sample content from the identified channel, and may transmit content samples 1006 to cloud computing/web servers 132 (e.g., Sample 1, Sample 2 . . . Sample n). Content sampling and transmission may be performed by, for example, SVD video/image/data service 234 (e.g., as illustrated in FIG. 2).

As discussed in regard to PD Video/Image/Data Service 214 in FIG. 2, cloud computing/web servers 132 may include search services configured to identify content and/or obtain metadata associated with content. Upon receiving content sample 1006 from content recognition module 1000, cloud computing/web servers 132 may identify the content from which content sample 1006 was sampled, and may transmit information 1008 (e.g., information 1, information 2 . . . information n) to content recognition module 1000, wherein information 1008 may identify and/or provide metadata regarding content sample 1006. Content recognition module 1000 may then be configured to determine whether the certain content (e.g., advertisements) has concluded on the channel based on information 1008 provided by cloud computing/web servers 132. For example, content recognition module may receive information 1008 allowing it to determine that programming content has resumed on the channel. Content recognition module 1000 may then transmit content complete message 1010 to PD 112.

Upon receiving content complete message 1010, PD 112 may activate notification 1012. Notification 1012 may indicate to the user of PD 112 that the certain content is complete on the channel (e.g., that the advertisements have ended and/or that programming content has resumed on the channel). Notification 1012 may be provided through a user interface in PD 112. The user interface may include elements that are typically associated with a smartphone, mobile phone, etc. including visual elements such as a display, LEDs, etc., audible elements such as a speaker, and/or tactile elements such as electromechanical components configured to cause PD 112 to vibrate. Notification 1012 may comprise at least one of visible, audible or tactile alerting including, for example, illuminated and/or flashing indicators, noises, alarms, vibration, etc. In one embodiment, a code-based indicator may be displayed on the user interface indicating that the certain content (e.g., advertisements) is complete on the channel, and that the channel may be displayed in SVD 102 by touching the code-based indicator. If the user proceeds to touch the code-based indicator, Control by PD function 216 (e.g., as illustrated in FIG. 2) may then cause SVD 102 to display the channel. In another embodiment PD 112 may, in addition to providing the notification to the user, automatically cause SVD 102 to display the channel.

While content recognition module 1000 has been disclosed as residing fully in SVD 102, the various embodiments are not limited to this configuration. Functions performed by content recognition module 1000 may also be divided between PD 112 and SVD 102 depending on, for example, the capabilities of each device. For example, if SVD 102 does not have the processing capacity to sample content and/or send the content samples to cloud computing/web servers 132, one or both of these operations may be performed by PD 112 (e.g., by PD Video/Image/Data Service 214 as illustrated in FIG. 2). If PD 112 is configured to perform at least the content sampling operation, additional functionality may also be provided for users to view and/or annotate the content samples. For example, a user may view a content sample, may identify the sample as associated with the certain content (e.g., as an advertisement), and may then annotate the sample to indicate that the sample is associated with an advertisement, a product/service to which the advertisement pertains, etc. prior to transmission to cloud computing/web servers 132. The ability to provide user-submitted input (e.g., also known as "crowd-sourcing") may increase the knowledge that is available in cloud computing/web servers 132, and thus, may increase the accuracy and/or speed of CBC. Moreover, the ultimate determination as to whether the certain content is complete on the channel may also be handled, alone or in part, by PD 112.

Figure 11:
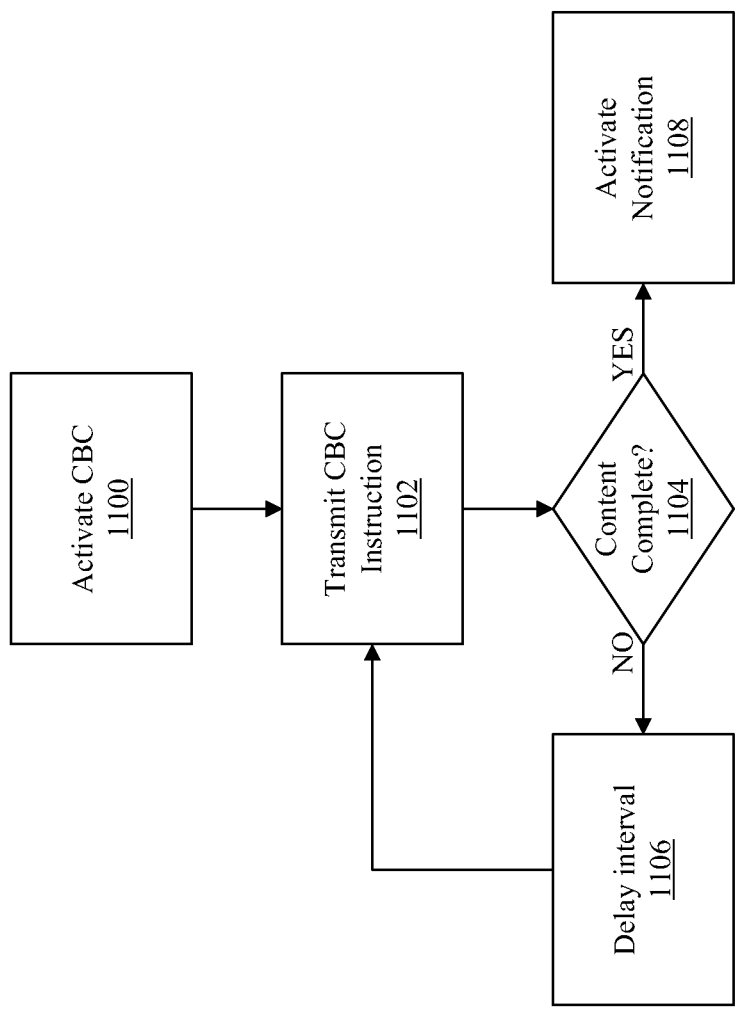
FIG. 11 illustrates a flowchart of example content-based control (CBC) operations from the perspective of a personal device.

A flowchart of example CBC operations from the perspective of PD 112 is illustrated in FIG. 11. CBC may be activated in operation 1100. CBC activation may occur automatically or manually as described above. PD 112 may then transmit a CBC instruction message in operation 1102. A determination may then be made in operation 1104 as to whether a message has been received in PD 112 indicating that certain content (e.g., advertisements) is complete on the channel. If in operation 1104 it is determined that a message has not been received, then PD 112 may delay in operation 1106 for an interval set for CBC instruction transmission. Following the interval, another CBC instruction may be transmitted in operation 1102. Alternatively, if in operation 1104 it is determined that a message indicating that the certain content is complete on the channel was received in PD 112, then a notification may be activated in operation 1108, the notification indicating to the user that the certain content is complete. The notification may be provided along with an option to display the channel, automatically displaying the channel, etc.

Figure 12:
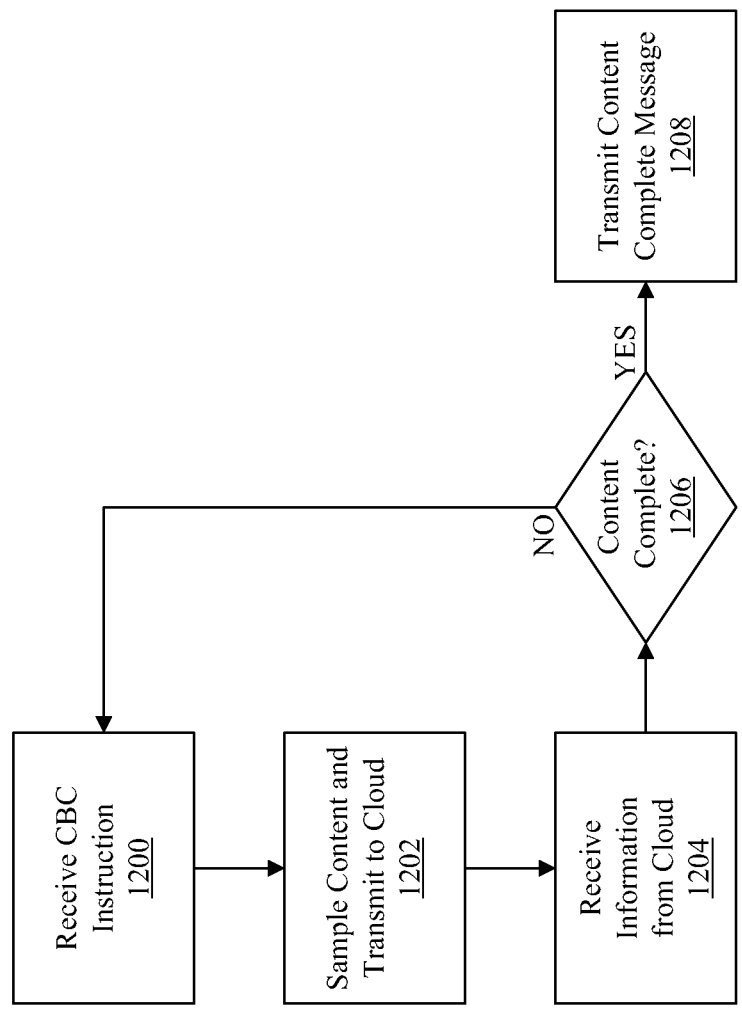
FIG. 12 illustrates a flowchart of example content-based control (CBC) operations from the perspective of a shared video device.

A flowchart of example CBC operations from the perspective of SVD 102 is illustrated in FIG. 12. A CBC instruction may be received in SVD 102 in operation 1200. In operation 1202 content from a channel (e.g., a channel indicated in the received CBC instruction) is sampled, and the content sample is transmitted (e.g., to cloud computing/web servers 132). SVD 102 may then receive information regarding the previously transmitted content sample (e.g., from cloud computing/web servers 132) in operation 1204. In operation 1206 a determination may then be made, based on the received information, as to whether certain content (e.g., advertisements) is complete on the channel. If it is determined in operation 1206 that the certain content is not complete on the channel (e.g., that advertisements are still airing on the channel), then the process may return to operation 1200 in preparation for the receipt of further CBC instructions. If a determination is made in operation 1206 that the certain content is complete on the channel, then in operation 1208 a content complete message may be transmitted.

While FIGS. 11-12 illustrate operations according to various embodiments, it is to be understood that not all of the operations depicted in FIGS. 11-12 are necessary for other embodiments. Indeed, it is fully contemplated herein that in other embodiments of the present disclosure, the operations depicted in FIGS. 11-12 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Thus, the present disclosure provides a method and system for content-based control. During content-based control a stream of content (e.g., a channel) may be sampled, and each sample may be transmitted to a remote processing resource. The remote processing resource may at least identify each sample, and may respond with information related to each sample. The information may be utilized to determine when certain content (e.g., advertisements) is complete on the channel. When it is determined that the certain content is complete on the channel, a notification may be activated in a device, the notification possibly being in made combination with the option to select, or the automatic selection of, the channel for viewing.

According to one aspect there is provided a system. The system may include at least one communications interface configured to transmit and receive messages, a user interface configured to provide a notification, and one or more storage mediums. In addition, the one or more storage mediums having stored thereon, individually or in combination, instructions that when executed by one or more processors result in the following operations comprising transmitting at least one message including instructions to sample content from a channel, receiving a message indicating that certain content on the channel is complete, and activating a notification indicating that the certain content on the channel is complete.

According to another aspect there is provided a system. The system may include at least one communications interface configured to transmit messages, receive messages and receive audio/visual content, and one or more storage mediums. In addition, the one or more storage mediums having stored thereon, individually or in combination, instructions that when executed by one or more processors result in the following operations comprising receiving a message including instructions to sample content from a channel, sampling content from the channel, transmitting a message including the content sample, receiving a message comprising information related to the content sample, and determining whether certain content is complete on the channel based on the received information.

According to another aspect there is provided a system. The system may include one or more storage mediums having stored thereon, individually or in combination, instructions that when executed by one or more processors result in the following operations comprising transmitting at least one message including instructions to sample content from a channel, receiving a message indicating that certain content on the channel is complete, and activating a notification indicating that the certain content on the channel is complete.

According to another aspect there is provided a system. The system may include one or more storage mediums having stored thereon, individually or in combination, instructions that when executed by one or more processors result in the following operations comprising receiving a message including instructions to sample content from a channel, sampling content from the channel, transmitting a message including the content sample, receiving a message comprising information related to the content sample, and determining whether certain content is complete on the channel based on the received information.

According to another aspect there is provided a method. The method may include transmitting at least one message including instructions to sample content from a channel, receiving a message indicating that certain content on the channel is complete, and activating a notification indicating that the certain content on the channel is complete.

According to another aspect there is provided a method. The method may include receiving a message including instructions to sample content from a channel, sampling content from the channel, transmitting a message including the content sample, receiving a message comprising information related to the content sample, and determining whether certain content is complete on the channel based on the received information.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed:

1. A system, comprising:
a mobile phone to wirelessly communicate with a cellular communication service, the mobile phone including:
communications circuitry to transmit and receive messages;
a user interface to provide a notification; and
one or more storage mediums having stored thereon, individually or in combination, instructions that when executed by one or more processors result in the mobile phone performing operations comprising:
receive at least one image from a television, the at least one image including an image of one or more identified users of the television;
transmit registration data to the television, the registration data including at least a selection of at least one of the one or more identified users of the television;
cause the television to change from displaying a first television channel to displaying a second television channel; and
responsive to a determination that the television has changed from displaying the first television channel to displaying the second television channel:
transmit, at a series of automatically configured defined intervals, a request to content recognition circuitry in the television, each request to cause the content recognition circuitry to determine whether content airing on the first television channel comprises an advertisement;
receive a message from the content recognition circuitry indicating that the content airing on the first television channel does not comprise an advertisement; and
responsive to receipt of the message, display a notification indicating that the content airing on the first television channel does not comprise an advertisement.

2. The system of claim 1, wherein when more than one request is transmitted, the requests are transmitted until the content airing on the first television channel does not comprise an advertisement.

3. The system of claim 1, wherein the notification is at least one of a visual, audible or tactile notification.

4. The system of claim 1, wherein the notification provides an option to select the first television channel for viewing on the television.

5. The system of claim 1, further comprising selecting the first television channel for viewing on the television.

6. A system, comprising:
communications circuitry to transmit messages, receive messages and receive audio/visual content; and
one or more storage mediums having stored thereon, individually or in combination, instructions that when executed by one or more processors of a television result in the television performing operations comprising:
transmit at least one image to a mobile phone, the at least one image including an image of one or more identified users of the television;
receive registration data from the mobile phone, the registration data including at least a selection of at least one of the one or more identified users of the television;
change from displaying a first television channel to displaying a second television channel;
receive, at content recognition circuitry in the television, at an automatically configured series of defined intervals, a request from the mobile phone to determine whether content airing on the first television channel comprises an advertisement;
responsive to receipt of the request, transmit a first message including at least a first portion of the content airing on the first television channel to a remote server;
receive a response to the first message including a determination of whether the content airing on the first television channel comprises an advertisement; and
responsive to the response to the first message indicating that the content airing on the first television channel does not comprise an advertisement, transmit a second message to the mobile phone.

7. A system, comprising one or more storage mediums having stored thereon, individually or in combination, instructions that when executed by one or more processors of a mobile phone, result in the mobile phone performing the following operations comprising:
receive at least one image from a television, the at least one image including an image of one or more identified users of the television;
transmit registration data to the television, the registration data including at least a selection of at least one of the one or more identified users of the television;
cause the television to change from displaying a first television channel to displaying a second television channel; and
responsive to a determination that the television has changed from displaying the first television channel to displaying the second television channel:
transmit, at a series of automatically configured defined intervals, a request to content recognition circuitry in the television to cause the content recognition circuitry to determine whether content airing on the first television channel comprises an advertisement;
receive a message from the television indicating that the content airing on the first television channel does not comprise an advertisement; and
responsive to receipt of the message, cause display of a notification indicating that the content airing on the first television channel does not comprise an advertisement.

8. The system of claim 7, wherein when more than one request is transmitted, the requests are transmitted until the content airing on the first television channel does not comprise an advertisement.

9. The system of claim 7, wherein the notification is at least one of a visual, audible or tactile notification.

10. The system of claim 7, wherein the notification provides an option to select the first television channel for viewing on the television.

11. The system of claim 7, further comprising selecting the first television channel for viewing on the television.

12. A system, comprising one or more storage mediums having stored thereon, individually or in combination, instructions that when executed by one or more processors of a television result in the television performing operations comprising:
transmit at least one image to a mobile phone, the at least one image including an image of one or more identified users of the television;

receive registration data from the mobile phone, the registration data including at least a selection of at least one of the one or more identified users of the television;

change from displaying a first television channel to displaying a second television channel;

receive, at content recognition circuitry in the television, at an automatically configured series of defined intervals, a request from the mobile phone to determine whether content airing on the first television channel comprises an advertisement;

responsive to receipt of the request, transmit a first message including at least a first portion of the content airing on the first television channel to a remote server;

receive a response to the first message including a determination of whether the content airing on the first television channel comprises an advertisement;

responsive to the response to the first message indicating that the content airing on the first television channel does not comprise an advertisement, transmit a second message to the mobile phone.

13. A method, comprising:

receiving, using a mobile phone, at least one image from a television, the at least one image including an image one or more identified users of the television; transmitting, using the mobile phone, registration data to the television, the registration data including at least a selection of at least one of the one or more identified users of the television;

causing the television to change from displaying a first television channel to displaying a second television channel; and responsive to a determination that the television channel has changed from displaying the first television channel to displaying the second television channel:

transmitting, using the mobile phone, at an automatically configured series of defined intervals, a request to content recognition circuitry in the television to cause the content recognition circuitry to determine whether content airing on the first television channel comprises an advertisement;

receiving, from the television, a message indicating that the content airing on the first television channel does not comprise an advertisement; and responsive to receipt of the message, causing display of a notification indicating that the content airing on the first television channel does not comprise an advertisement.

14. The method of claim 13, wherein when more than one request is transmitted from the mobile phone, the requests are transmitted until the content airing on the first television channel does not comprise an advertisement.

15. The method of claim 13, wherein the notification is at least one of a visual, audible or tactile notification.

16. The method of claim 13, wherein the notification provides an option to select the first channel for viewing on the television.

17. The method of claim 13, further comprising selecting the first television channel for viewing on the television.

18. A method, comprising:

transmitting, by a television, at least one image to a mobile phone, the at least one image including an image of one or more identified user of the television;

receiving, by the television, registration data from the mobile phone, the registration data including at least a selection of at least one of the one or more identified users of the television;

changing from displaying a first television channel to displaying a second television channel;

receiving, at content recognition circuitry in the television, at an automatically configured series of defined intervals, a request from the mobile phone to determine whether content airing on the first television channel comprises an advertisement;

responsive to receipt of the request, transmitting a first message including at least a first portion of the content airing on the first television channel to a remote server;

receiving a response to the first message including a determination of whether the content airing on the first television channel comprises an advertisement;

responsive to the response to the first message indicating that the content airing on the first television channel does not comprise an advertisement, transmitting a second message to the mobile phone.

19. The system of claim 1 wherein the automatically configured defined intervals are determined based on at least one of: a processing capacity of the mobile phone or a communication bandwidth availability between the mobile phone and the television.

20. The system of claim 6 wherein the automatically configured defined intervals are determined based on at least one of: a processing capacity of the mobile phone or a communication bandwidth availability between the mobile phone and the television.

21. The system of claim 7 wherein the automatically configured defined intervals are determined based on at least one of: a processing capacity of the mobile phone or a communication bandwidth availability between the mobile phone and the television.

22. The system of claim 12 wherein the automatically configured defined intervals are determined based on at least one of: a processing capacity of the mobile phone or a communication bandwidth availability between the mobile phone and the television.

23. The method of claim 13 wherein the automatically configured defined intervals are determined based on at least one of: a processing capacity of the mobile phone or a communication bandwidth availability between the mobile phone and the television.

24. The method of claim 18 wherein the automatically configured defined intervals are determined based on at least one of: a processing capacity of the mobile phone or a communication bandwidth availability between the mobile phone and the television.

* * * * *